Feb. 22, 1949. C. A. ERICKSON 2,462,372
PUMP
Filed June 14, 1944
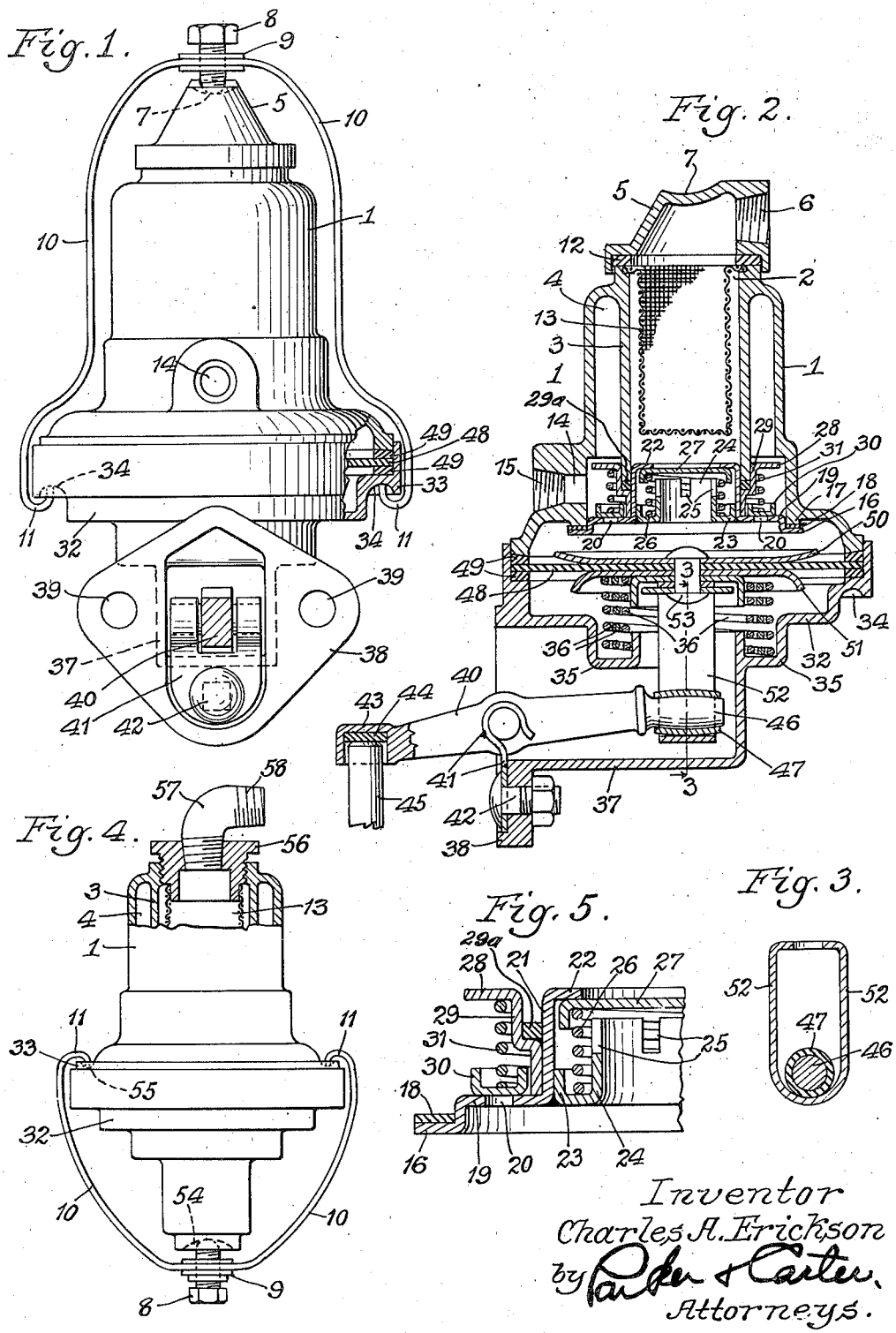
Inventor
Charles A. Erickson
by Parker & Carter,
Attorneys.

Patented Feb. 22, 1949

2,462,372

UNITED STATES PATENT OFFICE 2,462,372

PUMP

Charles A. Erickson, Dearborn, Mich., assignor, by mesne assignments, to F. L. Jacobs Co., Detroit, Mich., a corporation of Michigan Application June 14, 1944, Serial No. 540,217

12 Claims. (Cl. 103—150)

This invention relates to a pump and particularly to a pump designed for supplying fuel to an internal combustion engine. It has for one object to form a pump of diaphragm type in which the pressure dome is inclined in a unitary housing.

Another object is to provide a pump having an adequate outlet valve in which the likelihood of clogging is reduced to a minimum.

Another object is to provide a pump, the parts of which are silent.

A further object is to provide a pump formed of several separable parts arranged to be secured together without the use of bolts or screws.

Other objects will appear from time to time throughout the specification and claims.

This invention is illustrated more or less diagrammatically in the accompanying drawings, wherein:

Figure 1 is a side elevation of the complete pump with the driving member shown in section;

Figure 2 is a vertical section with parts in elevation;

Figure 3 is a sectional detail taken at line 3—3 of Figure 2; and

Figure 4 is a side elevation of a modified form of pump, with parts in section; and Figure 5 is a detailed section, on an enlarged scale, of the valve seats and valves.

Like parts are indicated by like characters throughout the specification and the drawings.

The housing is preferably formed of two main members which may be cast or otherwise produced. As shown, the housing comprises an upper portion 1. An opening 2 is formed in the upper end of the housing portion 1. An internal and preferably annular wall 3 is positioned inwardly of the outer wall housing 1, and the two form together a space 4 of annular shape which comprises a pressure dome or pressure space. In the particular form shown in Figures 1 and 2, the upper end of the housing is closed by a member 5 which has a threaded inlet opening 6 suitable for connection to a source of supply. It may have a depression 7 in its upper end adapted to have seated in it a locking and adjusting screw 8 which is engaged in a bearing 9 fixed in a bail 10.

The bail is provided with two inwardly turned ends 11, the operation of which will be described below. The member 5 is seated in the opening 2 of the housing 1, and a sealing gasket or other leak preventing member 12 may be positioned between them. A screen 13 may be positioned within the inner space defined by the annular wall 3. An outlet opening 14 is formed in the housing 1 and may terminate in a threaded portion 15 suitable for receiving an outlet pipe. The seat member for the inlet and outlet valves comprises a ring-like member having a lower portion 16 which may be seated against a stop portion 17 formed in the housing 1.

A sealing gasket 18 may be positioned between the two, if desired. Integral with the member 16 is a raised portion 19 which is provided with a plurality of perforations 20. Integral with the portion 19 is an upwardly extending portion 21 which has formed integrally with it an inwardly extending flange 22 which serves as a seat for the inlet valve. Fixed to the portion 21 is a flange 23 which extends from the annular member 24. This member is notched, as at 25. Positioned about the portion 24 is a spring 26 which contacts the under side of a valve member 27. A spring abutment 28 is formed as a part of an annular member 29 which is secured to the portion 21. A valve 30 is formed as a ring and is positioned to close the valve openings 20 in the member 19. A spring 31 normally holds the valve seated. The member 29 and the portion 21 define an annular channel receiving a sealing ring 29a which seals the lower end of the inner wall 3.

In the form shown in Figures 1, 2 and 4, the housing is formed of two main members. They are the same except that in the forms of Figures 1 and 2 a groove is formed in the upper part of the lower housing member to be engaged by the points 11 of the bail 10. In the form of Figure 4 the groove is formed in the lower part of the upper housing.

The lower housing member is designated generally by the numeral 32. It is generally rounded in cross section and is provided with an upstanding edge 33 around and adjacent which is formed a groove 34. This groove may extend substantially about the housing or may be interrupted, so long as it is of sufficient extent to provide a point of engagement with the bail ends 11.

Within the housing member 32 is formed a depression or annular groove-like member 35 within which one or more diaphragm-operating springs 36 may be positioned. A lateral extension 37 is formed as a part of the housing member 32, and it is provided with a laterally extending flange 38 which is perforated, as at 39, 39, to receive screws or bolts by means of which the pump may be fastened to a support. A pump-operating lever 40 is movably mounted within the lateral extension 37, and it is supported on a bearing member 41 which is bolted by a bolt 42 to a portion of the flange 38.

At its outer end the lever 40 has a cup-like portion 43 which may have within it a cushioning or sound-deadening member 44 against which the upper end of the lever-operating means 45 is seated. At its opposite end the lever 40 is provided with a rounded portion 46 which may be surrounded by a cushioning member 47 which may be of synthetic rubber or other cushioning and sound-deadening material.

A diaphragm 48 is positioned between the two housing members 1 and 32 and its edge or periphery is engaged between these members. Gaskets or packings 49 may be positioned about the edges of the diaphragm 48 and between those edges and the adjacent portions of the housings 1 and 32. An upper stiffening plate 50 may be secured above the diaphragm and a lower stiffening plate 51 may be secured below it. A stirrup-like member 52 is secured to the diaphragm or to the diaphragm-reinforcing members. The plates 50, 51 and the stirrup 52 may conveniently be secured in place by a rivet 53.

As shown in Figures 1 and 2, that end of the lever 40 which is surrounded by the cushioning material 47 is positioned within and therefore engages or is adapted to engage the stirrup 52.

In the modified form of Figure 4 the only difference is in the location of the bail and the groove which the bail itself engages. The same reference numerals are applied to the bail in each case. The adjusting screw 8 of the bail is positioned or centered in a depression 54 formed in the lower end of the lower housing 32 and the points 11 of the bail are positioned in a groove 55 which is formed about the lower end or edge of the upper housing 1.

Inlet connection means shown in Figure 2 may be applied to the form of Figure 4 or a modified construction may be substituted for it. As there shown, instead of the member formed of the parts 5, 6 and 7, a gland 56 is positioned in the upper open end of the housing 1 and an elbow 57 is threaded or otherwise secured to it. The elbow 57 is threaded, as at 58, to receive a supply conduit.

Although I have shown an operative form of my invention, it will be recognized that many changes in the form, shape and arrangement of parts can be made without departing from the spirit of the invention, and my showing is therefore to be taken as, in a sense, diagrammatic. Among the changes which can be made are a variety of gasket constructions. The invention is not limited to any particular gasket arrangement. I have pointed out gaskets 49 as shown in Figure 1, and these might or might not be present. Also, gaskets may be present at one or another of the points of contact between the valve cage and the inner wall 3 of the vapor dome. In general, of course, the construction is such either with or without gaskets as to prevent the leakage of liquid from one part of the pump to another and to compel such liquid to flow along the proper and predetermined paths.

The use and operation of this invention are as follows:

It is assembled as shown and is mounted on any suitable support adjacent a power means for operating the pump. The pump as above mentioned has one particular application in which it is used as a fuel pump for furnishing fuel to an internal combustion engine. When that is done it may be conveniently mounted on the engine housing or adjacent it and is driven from some part of the engine which operates it. The driving member rises and falls and through it moves the lever. The lever by means of the stirrup constructions pulls the diaphragm down with the resistance of the spring or springs positioned adjacent the diaphragm and biased normally to raise it. When the diaphragm is pulled downward by the operation of the lever suction is created within the chamber above the diaphragm and the inlet valve is opened against the resistance of the spring which is biased to hold it closed. Fluid is thus drawn into the pump housing through the inlet valve and into the chamber below the inlet valve and above the diaphragm. When the lever rises to permit the spring or springs to raise the diaphragm, the pressure which is created in the chamber above the diaphragm closes the inlet valve and opens the outlet valve against the resistance of its spring. Liquid is discarded therefore through the outlet valve which has as above mentioned several openings and passes outwardly through the outlet connections.

The member 28 acts as a deflector and prevents liquid as it moves through the valve opening 20 from being discharged directly into the annular chamber 4 which acts as a pressure dome. The cushioning member above the operating member and seated in the lever socket tends to quiet the operation of the device. Similarly the cushioning member positioned around that part of the lever which is in contact with the stirrup cushions the operation of the device at that point. These two cushioning members tend to make the operation of the device as silent as possible.

In the form shown in Figure 1 or in Figure 4 the parts are held together by means of the bail and the bail is positioned with its central portion adjacent one of the housing members and its hook-like portions engage the other housing members and hold them together. The pressure of the bail may be adjusted by adjusting the screw which is engaged with it. By using the bail the device as a whole may be made somewhat smaller because the diaphragm is engaged at its edges by pressure exerted through the bail upon the two housing members which engage or embrace the edges of the diaphragm. In constructions where the parts are screwed or bolted together they and the diaphragm must be given a greater diameter than is the case in the present construction because space must be left for perforations in the diaphragm through which screws or bolts pass and correspondingly space must be provided in the housing members to receive the screws or bolts. The bail construction thus eliminating the necessity of screws or bolts permits a reduction in the overall size of the device.

By forming the pressure dome integrally or otherwise within one of the housings the device is also reduced in size. Heretofore pressure domes have been formed as separate parts inserted in the system and consequently occupy extra space. By forming the pressure dome integrally with or within one of the housing members itself the overall dimensions of the pump can be reduced and this is true even though it might be necessary to increase the diameter of the housing section 1. The maximum diameter of such a device is the diameter of the diaphragm itself and the housing parts which engage the diaphragm and whether or not the housing section 1 is increased in diameter somewhat to provide space for the pressure dome the overall diameter of the device is not increased since that is determined by the diameter of the diaphragm. If the pressure dome were positioned above the housing it would cause an increase in the overall height of the device and hence by forming the pressure dome as it is formed in the present invention the overall dimensions of the pump are reduced. The construction also reduced the number of parts used and hence reduces the amount of work required to accomplish assembly.

I claim:

1. A pump, comprising a plurality of housing members, one of said housing members having an external and an internal wall and defining an inlet passage and an outlet passage, the two walls being concentric and defining between themselves an annular pressure dome communicating with said outlet passage, an inlet valve and a seat therefor, a stop member adjacent said inlet valve, a spring biased normally to hold said inlet valve seated, an outlet valve seat, an outlet valve, a spring biased to hold said outlet valve seated and a diaphragm positioned between said housing members and having its periphery firmly gripped by said housing members, a spring biased to move said diaphragm in one direction, and means for moving said diaphragm in the opposite direction.

2. A pump, comprising a plurality of housing members, one of said housing members having an external and an internal wall and defining an inlet passage and an outlet passage, the two walls being concentric and defining between themselves an annular pressure dome communicating with said outlet passage, an inlet valve and a seat therefor, a stop member adjacent said inlet valve, a spring biased normally to hold said inlet valve seated, an outlet valve seat, having a plurality of openings in it, an outlet valve annular in shape, a spring biased to hold said valve seated and a diaphragm positioned between said housing members and having its periphery firmly gripped by said housing members, a spring biased to move said diaphragm in one direction, and means for moving said diaphragm in the opposite direction.

3. A pump, comprising a plurality of housing members, one of said housing members having an external and an internal wall, the two walls defining between themselves an annular pressure dome, an inlet valve and a seat therefor, a stop member adjacent said inlet valve, a spring biased normally to hold said inlet valve seated, an outlet valve seat, an outlet valve, a baffle positioned adjacent the entrance end of said pressure dome, a spring biased to hold said outlet valve seated and bearing at one end against said baffle, a diaphragm positioned between said housing members and having its periphery firmly gripped by said housing members, a spring biased to move said diaphragm in one direction, and means for moving said diaphragm in the opposite direction.

4. A pump, comprising a plurality of housing members, one of said housing members having an external and an internal wall and defining an inlet passage and an outlet passage, the two walls being concentric and defining between themselves an annular pressure dome communicating with said outlet passage, an inlet valve and a seat therefor positioned within the inner wall, a stop member adjacent said inlet valve, a spring biased normally to hold said inlet valve seated, an outlet valve seat, having a plurality of openings in it, an outlet valve annular in shape, a spring biased to hold said valve seated and a diaphragm positioned between said housing members, a spring biased to move said diaphragm in one direction, and means for moving said diaphragm in the opposite direction.

5. A pump, comprising a plurality of housing members, one of said housing members having an external and an internal wall, the two walls defining between themselves an annular pressure dome, an inlet valve and a seat therefor positioned within the inner wall, a stop member adjacent said inlet valve, a spring biased normally to hold said inlet valve seated, an outlet valve seat, having a plurality of openings in it, an outlet valve annular in shape, a baffle positioned adjacent the entrance end of said pressure dome, a spring biased to hold said outlet valve seated and bearing at one end against said baffle, a diaphragm positioned between said housing members and having its periphery firmly gripped by said housing members, a spring biased to move said diaphragm in one direction, and means for moving said diaphragm in the opposite direction.

6. In combination, in a pump, two housing members, means for joining them together, said housing members when joined comprising the entire housing element for a pump system including a pressure dome, one of said housing members shaped to provide an inlet passage and shaped to provide two walls with an annular pressure dome, a screen positioned in said inlet passage, means providing an inlet valve adjacent said passage, means for providing an annular seat for said valve, an annular stop for said inlet valve, said annular stop being notched to provide inlet apertures and a spring supported by said annular member and biased to hold the valve closed, an annular outlet valve seat, a plurality of outlet openings in said seat, an annular valve adapted to be seated on said seat, a baffle in the liquid flowing through said outlet valve and positioned to baffle liquid away from said pressure dome and a spring bearing against said outlet valve and against said baffle and biased to hold said outlet valve seated, pumping means comprising a diaphragm, and a plurality of springs biased to move said diaphragm in one direction and a linkage adapted to move said diaphragm in the opposite direction against the resistance of said spring, said linkage describing a stirrup like member adapted to said diaphragm, a rigid unitary lever, a bearing for said lever supported by one of said housing members, said lever adapted to penetrate into said stirrup, said lever leaving cushioning means between it and said stirrup and a lever driving member adapted to be moved to move said lever, cushioning means being positioned between said lever and said driving means.

7. A fuel pump comprising a casing having an annular outer wall and an annular inner wall forming chambers one within the other, a valve plate extending across the outer chamber at one end, inlet and outlet valve means on the plate for controlling the flow of fuel between the chambers, means sealing the lower end of the inner chamber to the plate so as to prevent flow of fuel between the chambers except through said valve means, a pump diaphragm fastened to the casing below the plate for alternately reducing, and increasing the fuel pressure below the plate, a filter in the inner chamber through which the fuel must flow, means closing the chambers at their ends opposite the valve plate, and inlet and outlet fuel lines connected respectively to the chambers.

8. A fuel pump valve assembly comprising a valve plate having a central opening, a valve disk adapted to close the opening, spring means normally urging the disk to closed position, the disk being arranged so that it opens under pressure of fuel at one side of the disk, said plate having one or more other openings spaced from the central opening, a ring plate for closing said other opening, spring means urging the ring plate towards closed position, the ring plate being arranged so that it opens under pressure of fuel at the other side of the disk, and a sealing ring carried by the plate intermediate said central opening and said one or more other openings.

9. A fuel pump comprising a casing having an outer annular wall and an inner annular wall forming chambers one within the other, a valve plate extending across the casing and having its marginal portion connected to the outer wall, spring pressed valve means on the plate for allowing fuel to flow through the plate in one direction from one chamber, spring pressed valve means on the plate for allowing fuel to flow through the plate in the other direction to the other chamber, annular means sealing the end of the inner chamber wall to the valve plate around one of the valve means, and means for effecting a pump action to force fuel from one of said chambers to the other.

10. A fuel pump comprising a casing having an outer annular wall and an inner annular wall forming chambers one within the other, a valve plate extending across the casing and having its marginal portion connected to the outer wall, valve means on the plate for controlling the flow of fuel between the chambers, annular means sealing the valve plate to the wall of the inner chamber to prevent flow of fuel between the chambers except through the valve means, and means for effecting a pump action to force fuel from one of said chambers to the other.

11. A fuel pump comprising a casing having an outer annular wall and an inner annular wall forming chambers one within the other, a valve plate extending across the casing and having its marginal portion connected to the outer wall, a diaphragm extending across said casing and cooperating with said plate to define a pumping space, spring pressed valve means on the plate for allowing fuel to flow through the plate in one direction from one chamber to said space, spring pressed valve means on the plate for allowing fuel to flow through the plate in the other direction from said space to the other chamber, annular means sealing the end of the inner chamber wall to the valve plate around one of the valve means, and means for effecting a pumping action to force fuel from one of said chambers to the other through said space.

12. A fuel pump comprising a casing having an annular outer wall and an annular inner wall forming chambers one within the other, a valve plate extending across the outer chamber at one end, means supported on said plate and including inlet valve means and outlet valve means for controlling the flow of fuel through said plate and means sealing said plate to said annular inner wall between said inlet valve means and said outlet valve means to prevent the flow of fuel between said chambers except through said valve means, a pump diaphragm extending across said casing below the plate for alternately reducing and increasing the fuel pressure below the plate, said casing including means closing the chambers at their ends opposite the valve plate, said casing having an annular downwardly presenting surface extending outwardly from the lower end of said outer wall, said valve plate having a cylindrical portion telescopically received in the lower end of said annular outer wall and an outwardly extending flange portion registering with said annular surface on said casing, and annular sealing means between said plate and said casing.

CHARLES A. ERICKSON.

REFERENCES CITED

The following references are of record in the file of this patent:

UNITED STATES PATENTS

| Number | Name | Date |
|---|---|---|
| 777,828 | Willmann | Dec. 30, 1904 |
| 883,496 | Sippert | Mar. 31, 1908 |
| 986,122 | Astrom | Mar. 7, 1911 |
| 1,711,803 | Munday | May 7, 1929 |
| 1,958,509 | Carter | May 15, 1934 |
| 2,036,452 | Babitch et al. | Apr. 7, 1936 |
| 2,055,154 | Mantle | Sept. 22, 1936 |
| 2,083,073 | Loeber | June 8, 1937 |
| 2,269,625 | Erickson | Jan. 13, 1942 |
| 2,291,074 | Flint | July 28, 1942 |

FOREIGN PATENTS

| Number | Country | Date |
|---|---|---|
| 440,693 | Great Britain | 1936 |
| 520,903 | Great Britain | 1940 |